United States Patent
Tsai et al.

(10) Patent No.: US 6,927,911 B2
(45) Date of Patent: Aug. 9, 2005

(54) LIGHT-GUIDE MODULE FOR EMITTING PARTICULAR POLARIZED LIGHT BEAMS

(75) Inventors: Ming-Lang Tsai, Hsinchu (TW); Chun-Hsiang Wen, Hsinchu (TW); Hui-Lung Kuo, Hsinchu (TW); Kuo-Tung Huang, Hsinchu (TW); Yaw-Ting Wu, Hsinchu (TW); Ying-Chiang Hu, Hsinchu (TW); Chih-Kng Lee, Hsinchu (TW); Liang-Bin Yu, Hsinchu (TW); Ping-Chen Chen, Hsinchu (TW); An-Shun Liu, Hsinchu (TW)

(73) Assignee: Industrial Technology Research Institute/Material Research, Hsinchu (TW)

( * ) Notice: Subject to any disclaimer, the term of this patent is extended or adjusted under 35 U.S.C. 154(b) by 18 days.

(21) Appl. No.: 10/456,483

(22) Filed: Jun. 9, 2003

(65) Prior Publication Data

US 2004/0051927 A1 Mar. 18, 2004

(30) Foreign Application Priority Data

Aug. 30, 2002 (TW) .......................... 91119833 A

(51) Int. Cl.$^7$ .............................. G02B 5/30; F21V 9/14
(52) U.S. Cl. .......................... 359/487; 359/495; 362/19
(58) Field of Search ................................ 359/487, 494, 359/495, 500, 530, 599, 529; 313/463; 345/76; 362/19, 551, 558, 560, 561; 349/67, 69, 96, 98, 175, 185, 194

(56) References Cited

U.S. PATENT DOCUMENTS

| | | | |
|---|---|---|---|
| 5,235,443 A | * 8/1993 | Barnik et al. | 349/194 |
| 5,982,540 A | * 11/1999 | Koike et al. | 359/487 |
| 6,005,713 A | 12/1999 | Carlson et al. | 359/500 |
| 6,317,180 B1 | * 11/2001 | Kuroiwa et al. | 349/96 |
| 6,507,379 B1 | * 1/2003 | Yokoyama et al. | 349/69 |
| 2001/0033417 A1 | 10/2001 | Lee et al. | 359/487 |
| 2004/0141108 A1 | * 7/2004 | Tanaka et al. | 349/96 |

* cited by examiner

*Primary Examiner*—Georgia Epps
*Assistant Examiner*—William Choi
(74) *Attorney, Agent, or Firm*—Birch, Stewart, Kolasch & Birch, LLP

(57) ABSTRACT

The light-guide module for emitting particular polarized light beams includes a splitter for separating non-polarized light beams, a transformer for converting polarization of light beams, and a non-polarized light source. The non-polarized light source emits light beams. Particular polarized light beams pass the splitter and other light beams are reflected by the splitter. Polarizations of reflected light beams and of light beams emitted by the non-polarized light source are converted by the transformer so as to separate the light beams later. Thus the light-guide module for emitting particular polarized light beams loses relatively little light energy.

28 Claims, 14 Drawing Sheets

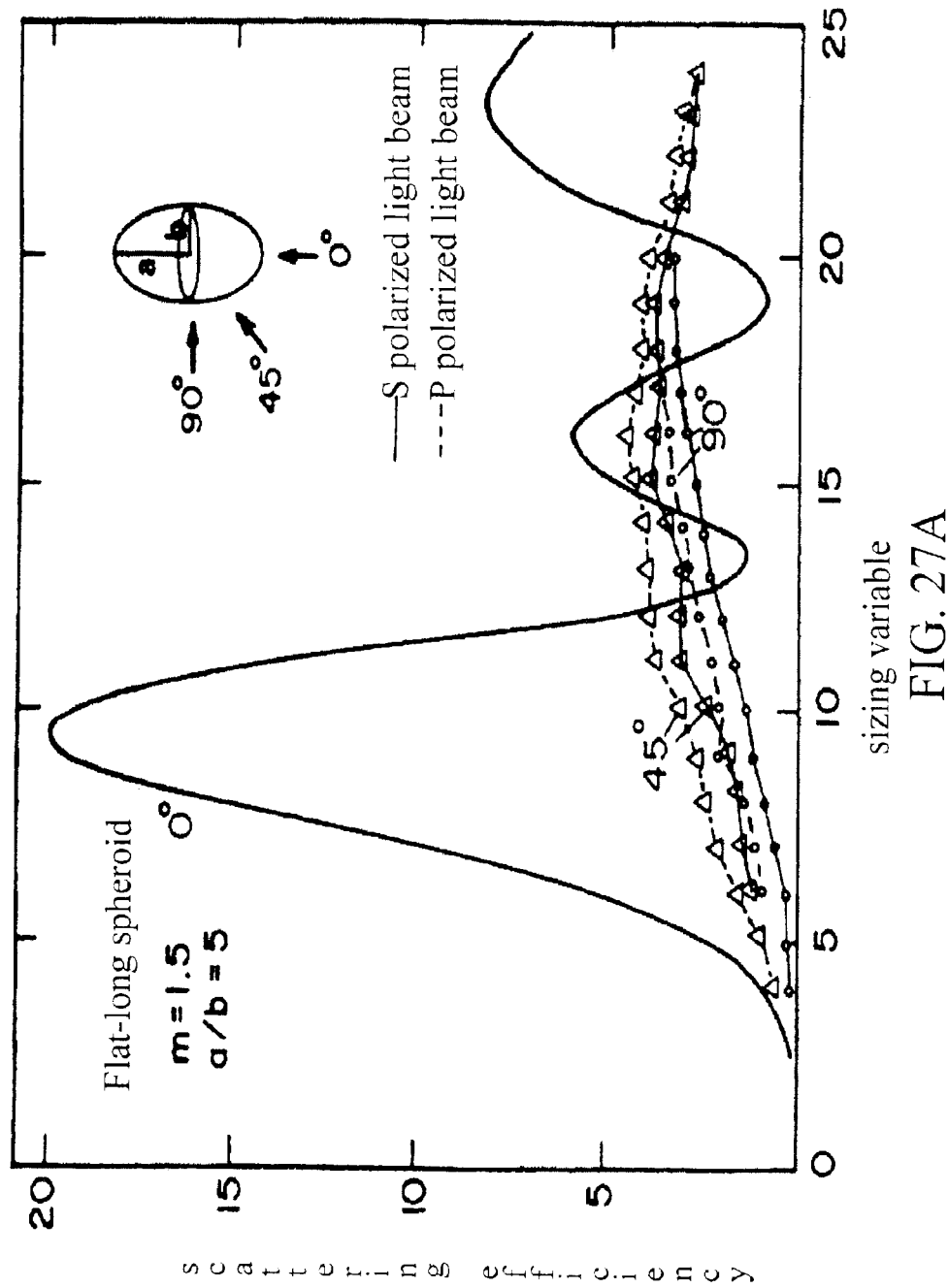

LIGHT-GUIDE MODULE FOR EMITTING PARTICULAR POLARIZED LIGHT BEAMS

BACKGROUND OF THE INVENTION

1. Field of Invention

The invention relates to electro-optical systems such as backlight modules of liquid crystal displays, cell phone displays, and personal digital assistants, and particularly to the light-guide module for emitting particular polarized light beam by converting light-beam polarization.

2. Related Art

Many electro-optical systems, such as backlight modules of liquid crystal displays, cell phone displays, and personal digital assistants, are non-lighting displaying apparatus, so adding light sources for displaying is needed.

The increased brightness demand of electro-optical systems on the market makes good use of light sources' electro-optical systems more and more important. Most liquid crystal displays have polarized plates installed close to outlets of light sources to let particular polarized light beams pass through and to let other light beams be reflected for emitting particular polarized light beams. However, the brightness of liquid crystal displays is limited by the amount of other light beams which exceed fifty percentages.

Two main body types of backlight modules are a single-surface electroluminesence (EL) and a cold cathode fluorescent lamp (CCFL).

As shown in FIG. 1, one main body type of liquid crystal display backlight modules is a single-surface EL 1. A single-surface EL 1 consists of a reflecting film 11, an insulating layer 12, a luminant layer 13, and a transparent electrode 14. Non-polarized light beams from the top surface of the luminant layer 13 pass through the transparent electrode 14. Non-polarized light beams from the bottom surface of the ruminant layer 13 pass through the insulating layer 12 and are reflected by the reflecting film 11, then pass through the insulating layer 12, the luminant layer 13, and the transparent electrode 14 in that order. Light beams separated by polarization of the polarized plate 15 result in over fifty-percent light energy loss of non-polarized light beams from the single-surface EL 1. Otherwise, non-polarized light beams from the bottom surface of the luminant layer 13 are absorbed by the reflecting film 11 when reflecting. So the single-surface EL 1 causes a high power consumption and limited displaying quality.

As shown in FIG. 2, one main body type of liquid crystal display backlight modules is a CCFL 2. A CCFL 2 consists of a guiding plate 21, a diffuse plate 22, a prism plate 23, a reflecting plate 24, and a light source 25. Non-polarized light beams from the light source 25 pass through the top and bottom surfaces of the guiding plate 21. Non-polarized light beams passing through the top surface of the guiding plate 21 pass the diffuse plate 22 and the prism plate 23, then emit out of the CCFL 2. Non-polarized light beams passing through the bottom surface of the guiding plate 21 are reflected by the reflecting plate 24 and pass the guiding plate 21, the diffuse plate 22, and the prism plate 23 in that order, then emit out of the CCFL 2. Also, light beams separated by polarization of the polarized plate 15 result in over fifty-percent light energy loss of non-polarized light beams.

The main reason of small size, low brightness, and a high power consumption of the liquid crystal display is light energy loss in the polarized plate 15, even taking a single-surface EL or a CCFL as the main body of backlight modules of liquid crystal displays. Instead of the polarized plate, a splitter for separating non-polarized light beams is used to solve light energy loss problems, and a transformer for converting polarization of light beams is used to increase the ratio of light passing the polarized plate. The splitter and the transformer are each disclosed in U.S. Pat. No. 6,005,713 and U.S. publication number 2001/0033417, respectively. For using in the range of the visible light spectrum, the splitter has to be a multi-layer film with at least 400 layers. The splitter is formed by alternately stacking two different materials with uniform force, so the refractive index and thickness has to be accurately controlled.

The transformer is a coating or a rough surface, but it is hard to achieve the goal of high transforming efficiency without an optimal design. On the contrary, light energy losses via absorbing and scattering by the transformer increase.

From above descriptions, it is important to design a light-guide module for emitting particular polarized light beams to achieve the goals hereinafter. The first goal is making a liquid crystal display with a larger size, higher brightness, and low power consumption by light-guide modules with high efficiency splitters and transformers. The second goal is making a simplified structure of light-guide modules.

SUMMARY OF THE INVENTION

The object of the invention is to provide a light-guide module for emitting particular polarized light beams with rather low light energy loss. After non-polarized light beams are separating by the splitter, the transformer converts their polarization by letting particular polarized light beams pass through and by letting other light beams be reflected. So the splitter re-separates converted light beams to increase usage of light energy.

The invention provides a light-guide module consisting of a non-polarized light source, a splitter for separating non-polarized light beams, and a transformer for converting polarization of light beams. The non-polarized light source emits non-polarized light beams. The splitter is set in one end of the non-polarized light source to let particular polarized light beams pass through and to let other light beams be reflected. The transformer is set in the other end of the non-polarized light source corresponding to the splitter to convert the polarization of light beams passing through.

The light-guide module for emitting particular polarized light beams is a combination of the non-polarized light source, the splitter, and the transformer. Thus, the splitter separates light beams by letting particular polarized light beams pass through and by letting other light beams be reflected, after the non-polarized light source emits non-polarized light beams. Then the transformer converts the polarizations of reflected light beams and of light beams emitted by the non-polarized light source. The splitter re-separates the converted light beams. So the light-guide module for emitting particular polarized light beams makes less light energy loss possible.

Further scope of applicability of the invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 25 is a schematic view of polarized degrees of scattering light beams in different scattering angles when non-polarized light beams hit non-absorbing particles smaller than the wavelengths of non-polarized light beams;

FIG. 26 is a relation chart of scattering efficiencies, sizing variables, and relative refractive indices;

FIGS. 27A and 27B are scattering efficiency relation charts of P and S polarized light beams in different shapes of spheroids, incident angles, and sizing variables.

DETAILED DESCRIPTION OF THE INVENTION

Figure 3:
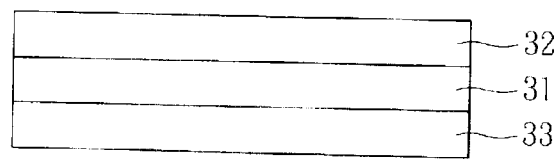
FIG. 3 is a schematic view of a light-guide module for emitting particular polarized light beams.

As shown in FIG. 3, the light-guide module for emitting particular polarized light beams consists of a non-polarized light source 31, a splitter 32 for separating non-polarized light beams, and a transformer 33 for converting the polarization of light beams to emit particular polarized light beams.

The non-polarized light source 31 emits non-polarized light beams.

The splitter 32 is set in one end of the non-polarized light source 31 to let particular polarized light beams pass through and to let other light beams to reflected. So the splitter 32 separates light beams by their polarization, unlike the prior art in which light beams that are unable to pass through are absorbed.

The transformer 33 is set in the other end of the non-polarized light source 31 corresponding to the splitter 32 to convert the polarization of light beams passing through.

Thus, non-polarized light beams are emitted to the splitter 32 and the transformer 33 by the non-polarized light source 31. Light beams emitted to the splitter 32 are separated by letting particular polarized light beams pass through and by letting other light beams be reflected. The transformer 33 converts the polarization of light beams reflected by the splitter 32. The splitter 32 re-separates converted light beams by letting particular polarized light beams pass through and by letting other light beams be reflected. So the invention increases usage of light beams emitted by the non-polarized light source 31.

Figure 1:
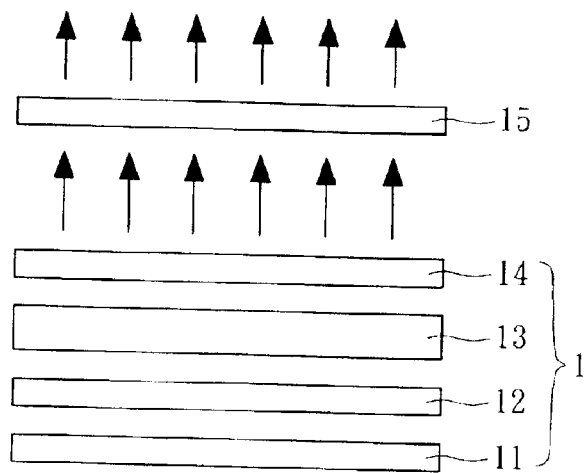
FIG. 1 is a schematic view of one main body type of liquid crystal display backlight modules using a single-surface EL.
Figure 2:
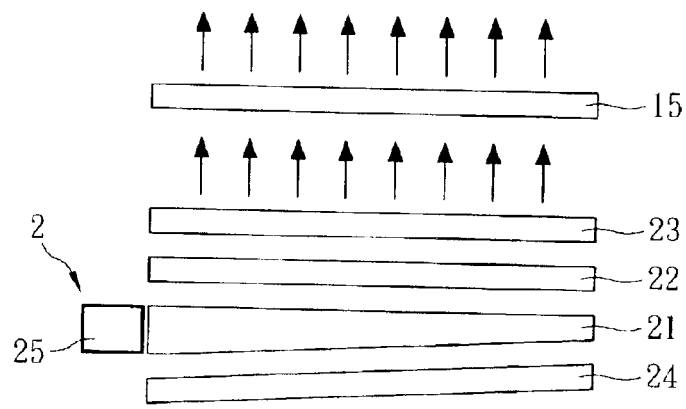
FIG. 2 is a schematic view of one main body type of liquid crystal display backlight modules using a CCFL.
Figure 4:
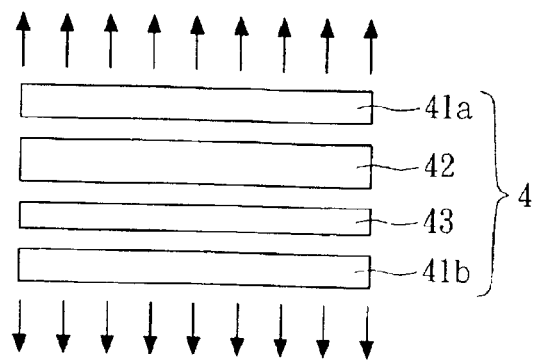
FIG. 4 is a schematic view of a two-surface EL.

As shown in FIGS. 1, 2, and 4, the non-polarized light source 31, which is single-surface EL, two-surface EL, or a CCFL, emits non-polarized light beams. Instead of the reflecting film 11, the transformer 33 reflects light beams. The two-surface EL consists of transparent electrodes 41a, 41b, a ruminant layer 42, and an insulating layer 43. The luminant layer 42 is placed between the insulating layer 43 and the transparent electrode 41a. The transparent electrode 41a is attached to the other side of the insulating layer 43.

Figure 5:
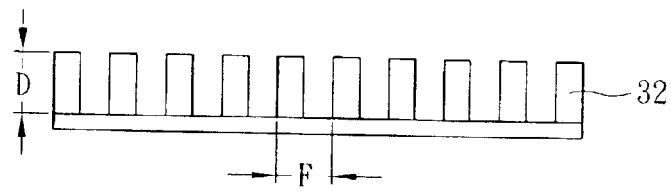
FIG. 5 is a schematic view of an embodiment of a splitter.

As shown in FIG. 5, the splitter 32 is a metal grating of nano-sizing with refractive index period (P) ranges from 10 to 170 nano-meters and depth (D) ranges from 10 to 200 nano-meters. Light beams with a polarized direction parallel to the nano-metal strip are reflected by the splitter 32, and light beams with a polarized direction perpendicular to the nano-metal strip pass the splitter 32 for separating light beams. The splitter 32 is made by ectroforming technology, micro-opto-electro-mechanical processing, reactive ion etching technology, optical mask of ion-beam lithography etching technology, nano-imprinting lithography, micro-contact printing, and electron-beam lithography.

Moreover, a refractive index is a complex number; the real part is a refractive index; the imaginary part is an extinction coefficient (direct proportion to the absorption coefficient). So metal of a low extinction coefficient, such as aluminum, gold, silver, and wolfram, is better for the material of the splitter 32.

Figure 22:
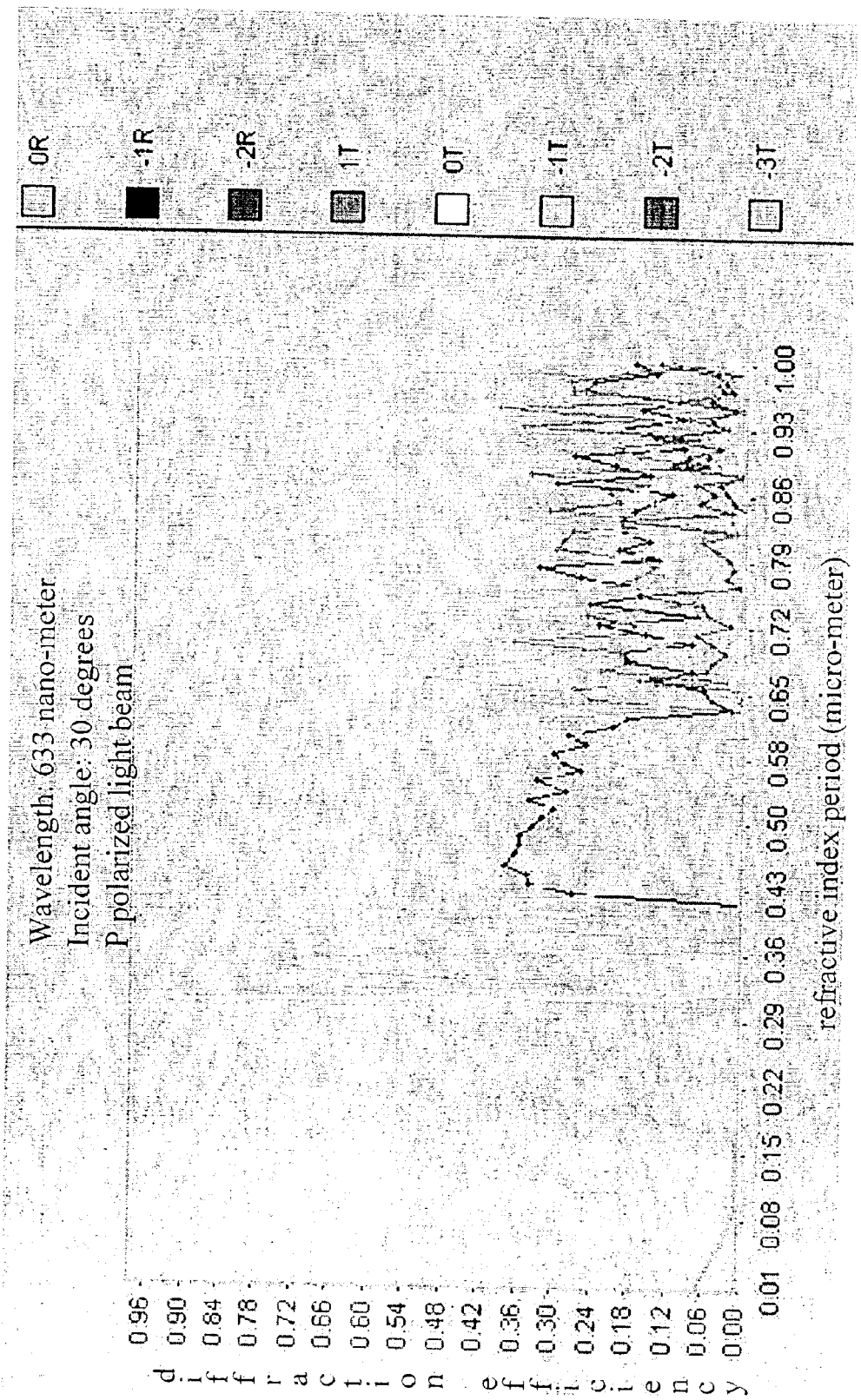
FIG. 22 is a relation chart of refractive index periods and diffraction efficiencies of P polarized light beams.
Figure 23:
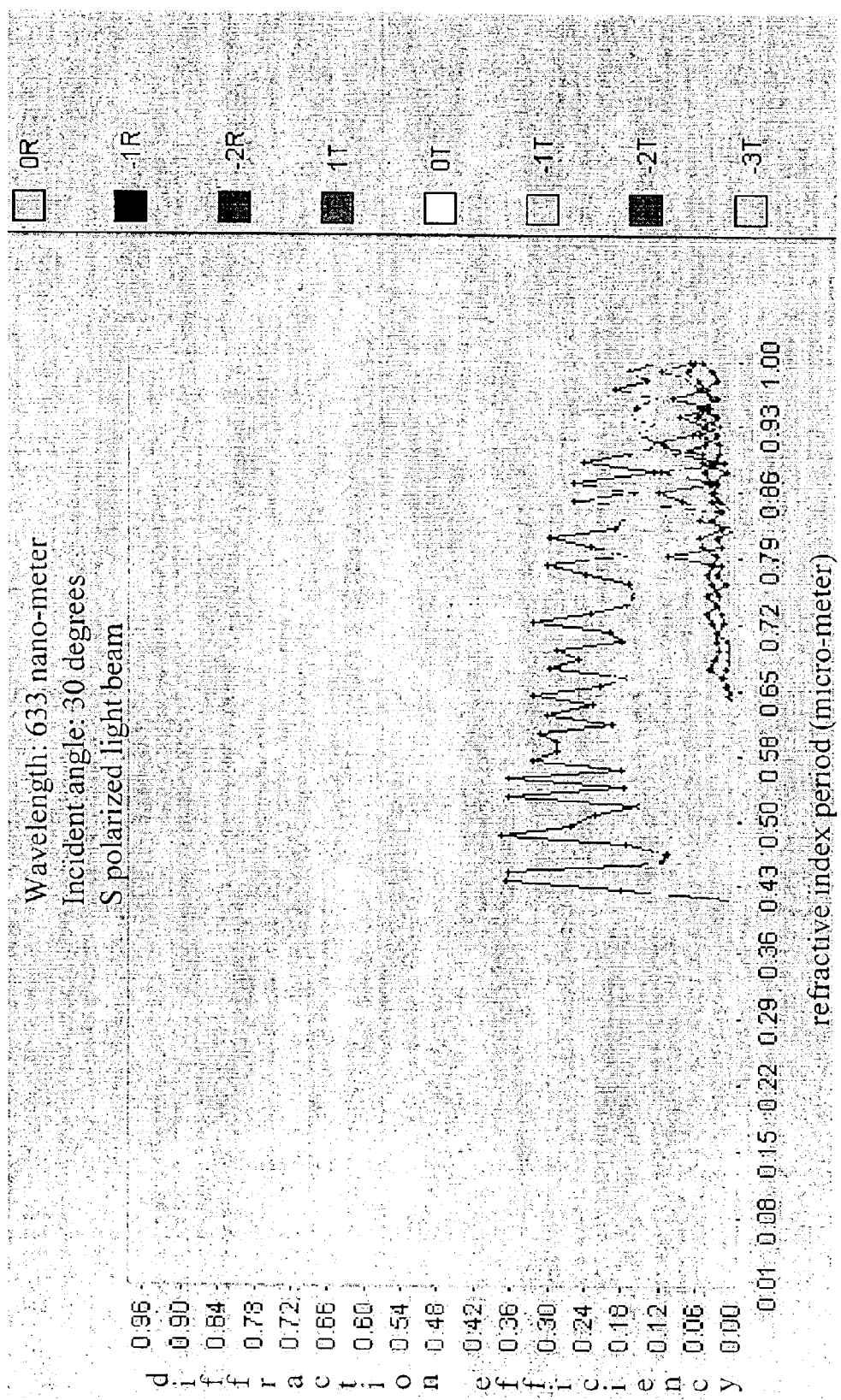
FIG. 23 is a relation chart of refractive index periods and diffraction efficiencies of S polarized light beams.

As shown in FIG. 22, a relation chart of refractive index periods and diffraction efficiencies of P polarized light beams, when the refractive index period of the splitter 32 ranges from 10 to 170 nano-meters, light beams have the best zero-order transmittance. As shown in FIG. 23, a relation chart of refractive index periods and diffraction efficiencies of S polarized light beams, when the refractive index period of the splitter 32 ranges from 10 to 170 nano-meters, light beams have the best zero-order reflectance. Otherwise, when the refractive index period of the splitter 32 is greater than 170 nano-meters, the zero-order transmittance and the zero-order reflectance decrease, and there are more high-order diffractive light beams, which effects the display quality of the liquid crystal display.

Figure 24:
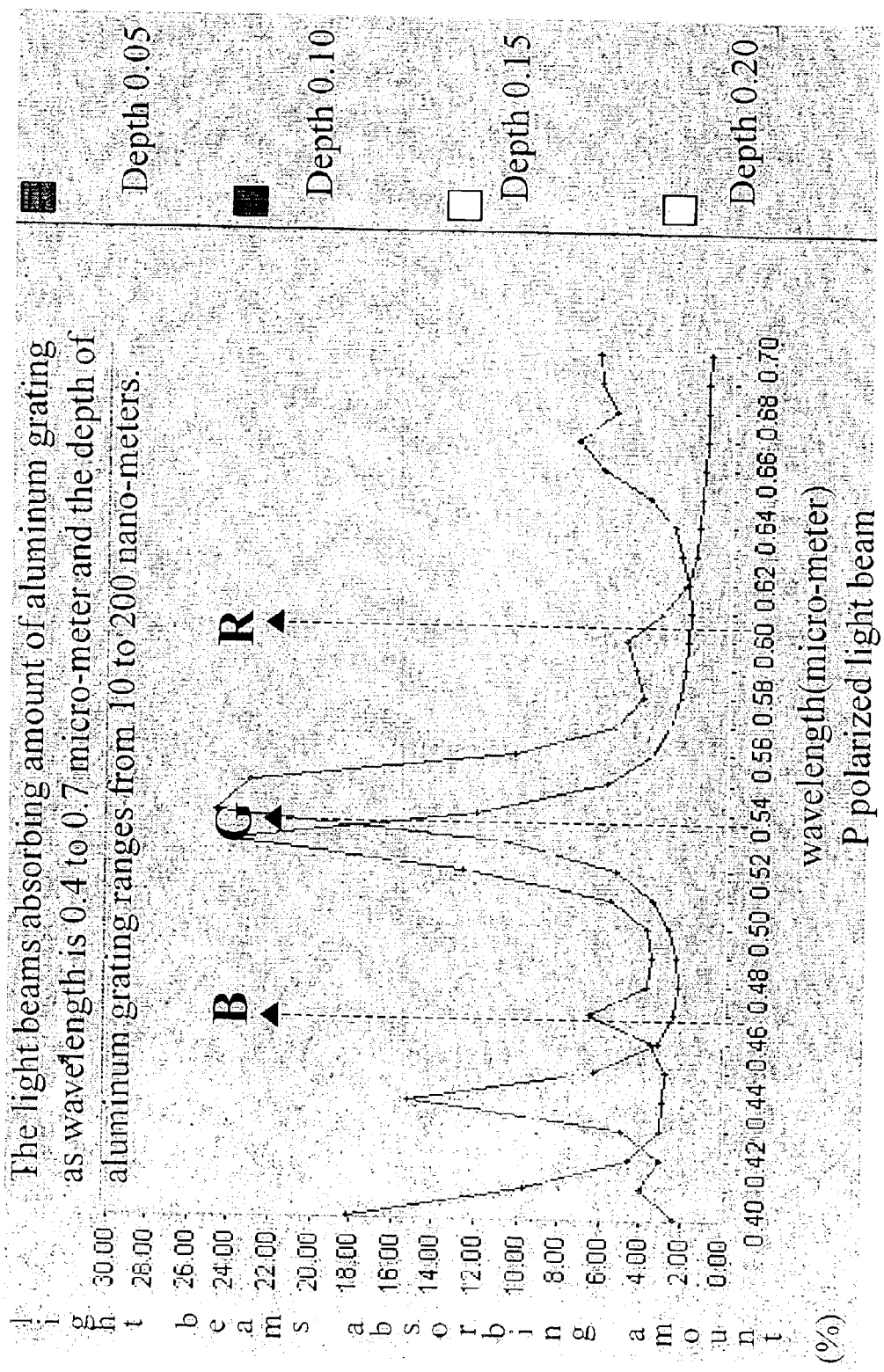
FIG. 24 is a relation chart of splitter depths and energy absorbing peaks of different wavelength light beams.

The same light energy absorbability of different wavelengths relates to the depth of the splitter 32, and the absorbability from energy absorbing peaks effects the display quality of the liquid crystal display. As shown in FIG. 24, a relation chart of splitter depths and energy absorbing peaks of different wavelength light beams, when the depth is 0.15 micrometers, the light energy absorbability of red light beams (R; wavelength is 610 nano-meters), green light beams (G; wavelength is 540 nanometers), and blue light beams (B; wavelength is 470 nano-meters) of the splitter 32 is about five percent. So the energy loss of the splitter 32 is low, and diffractive light energy of three colors stays uniform. The depth of the splitter 32 ranges from 10 to 200 nano-meters.

Figure 6:
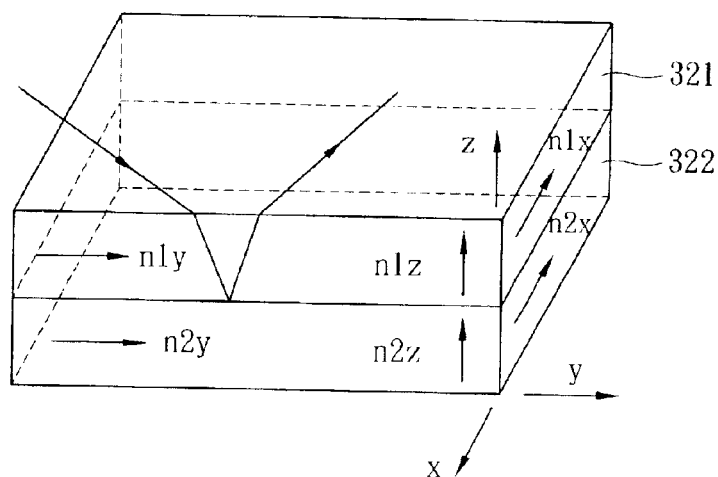
FIG. 6 is a schematic view of the other embodiment of a splitter.

Another kind of splitter 32, as shown in FIG. 6, disclosed in U.S. Pat. No. 5,962,114 is a multi-layer film to separate light beams by their polarization. For example, two thin films 321, 322 are stacking up in z direction, and the refractive coefficient in x, y, z directions of thin films 321, 322 are (n1x, n1y, n1z) and (n2x, n2y, n2z). As the signs of (n1y–n2y) and (n1z–n2z) are the same, polarized light beams in the x direction pass through the splitter 32, and polarized light beams in the y direction are reflected by the splitter 32 to separate into different polarized light beams. One way of making the multi-layer film is by repeatedly stacking up PEN (2,6-polyethylene naphthalate) and coPEN (polymerization by naphthalic acid, terephalic acid, and ethylene glycol). So the multi-layer film lets particular polarized light beams pass through and let other light beams be reflected.

Figure 7:
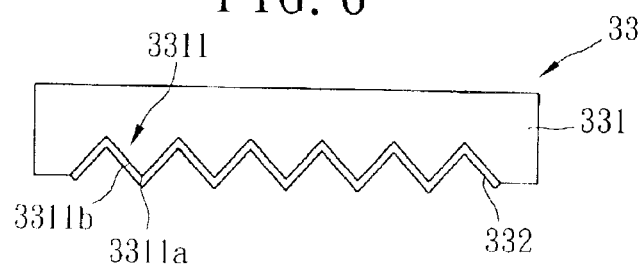
FIG. 7 is a schematic view of an embodiment of a transformer.

As shown in FIG. 7, one kind of the transformer 33 consists of a bottom cover 331 and a phase retardation film 332. The bottom cover 331 has a ridge surface with several ridge members 3311, each having a ridge line 3311a and two reflected surfaces 3311b. The angle of the adjacent surfaces 3311b of the two ridge members 3311 ranges from 45 to 35 degrees, and distances between each ridge member 3311 may or may not be the same. The phase retardation film 332 has high reflectance and is attached to the ridge surface of the bottom cover 331. The mold of the ridge surface of the bottom cover 331 is made by recombining technology, electroforming technology or micro-opto-electromechanical processing. The bottom cover 331 is made by injection molding technology, rolling press technology or platen press technology. The phase retardation film 332 is a dry film made by optical precision spinning technology.

Figure 8:
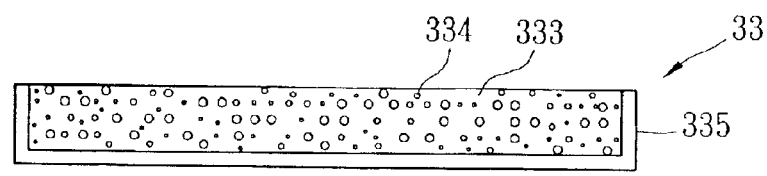
FIG. 8 is a schematic view of the other embodiment of a transformer.

As shown in FIG. 8, another kind of the transformer 33 consists of a transparent thin film 333, non-absorbing particles 334, and a phase retardation film 335. The thickness of the transparent thin film 333 is less than 20 micrometers for reducing the absorbing degrees of light beams. The refractive index of the transparent thin film 333 and the refractive index of the non-polarized light source 31 are close or the same for avoiding total internal reflection in interface of the transparent thin film 333 and the non-polarized light source 31. Non-absorbing particles 334 disperse in the transparent thin film 333. The scattering degree effects scattering efficiency and polarized transforming efficiency of non-polarized light beams. The size of non-absorbing particles 334 with uneven refractive indices ranges from several nano-meters to several micrometers. The shape of the non-absorbing particles 334 is a globe, a spheroid, a cylinder, or other polyhedrons. The material of the non-absorbing particles 334 is barium sulfate (BaSO4), magnesium oxide (MgO), titniuma dioxide (TiO2), or zinc sulfide (ZnS), with an extinction coefficient equaling zero for reducing light beam energy loss in transforming polarization. The phase retardation film 335 is set on one surface and the side surfaces of the transparent thin film 333 for avoiding light beam loss. The transformer 33 is made by functional mixing glue coating technology, sol-gel and spinning coating technology, paint coating technology, plasma surface modified technology, optical precision coating technology, or sputtering technology.

When non-polarized light beams hit non-absorbing particles 334 inside the transparent thin film 333, light beams scatter to change their polarization (polarized degree and scattering degree are related to the size, shape, and the reflectance of the non-absorbing particles 334) then pass the non-polarized light source 31 and the phase retardation film 32 for separating.

Figures 25, 26:
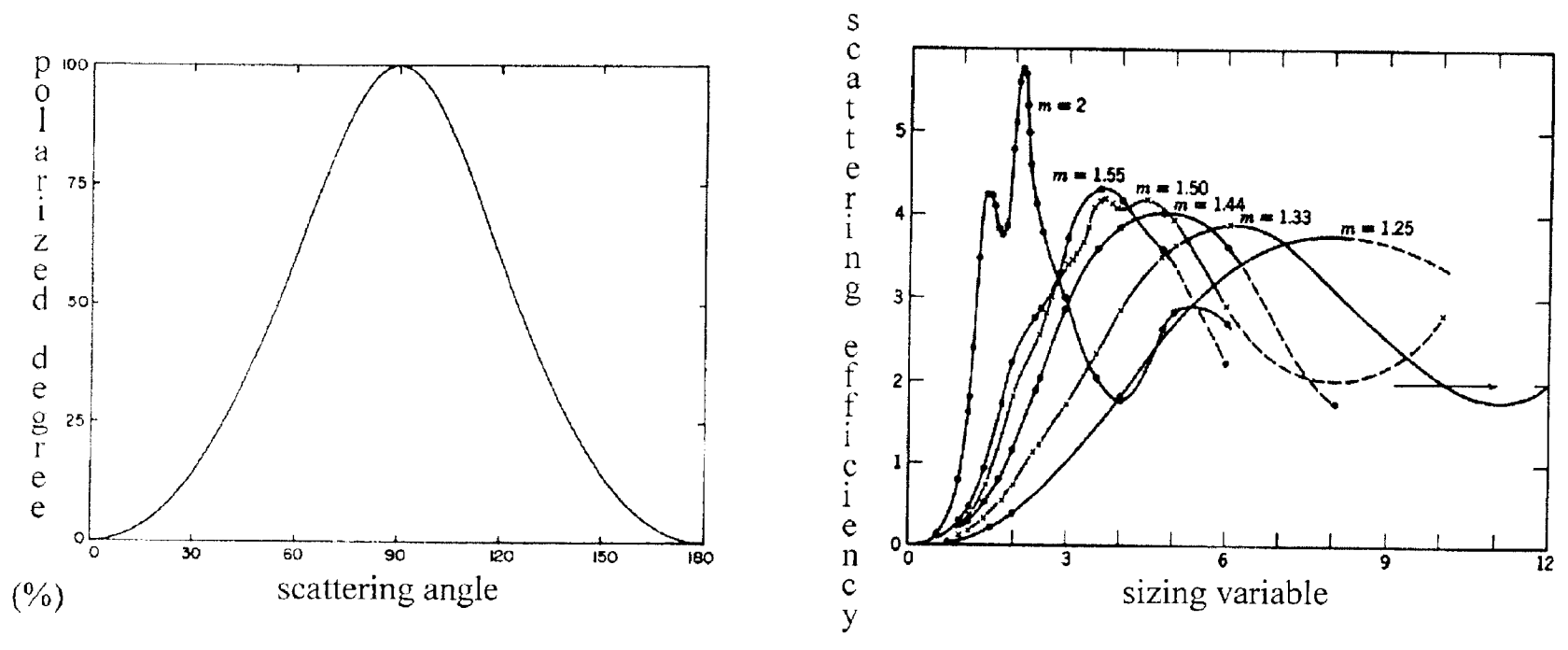
Figure 27B:
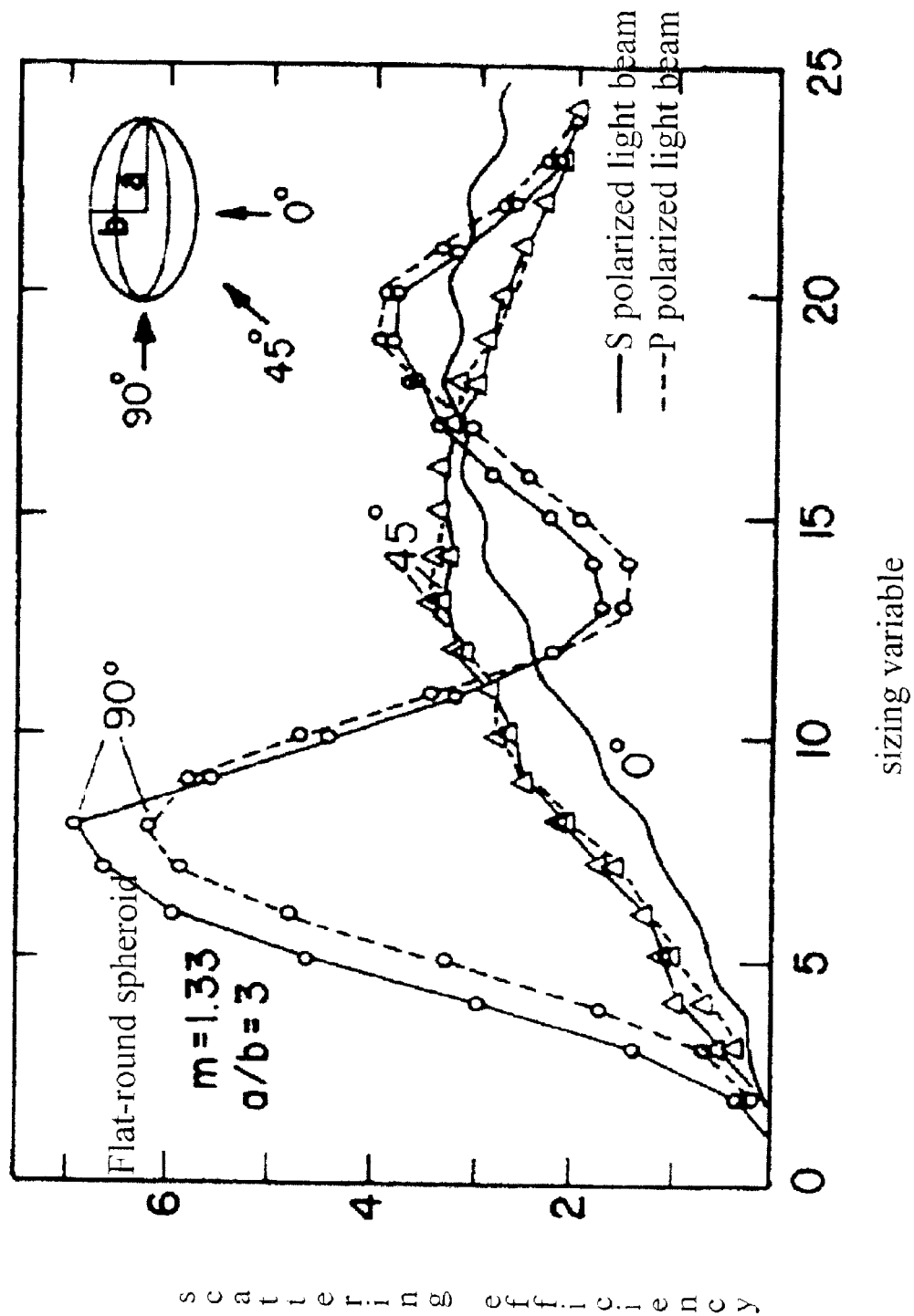
Figure 28:
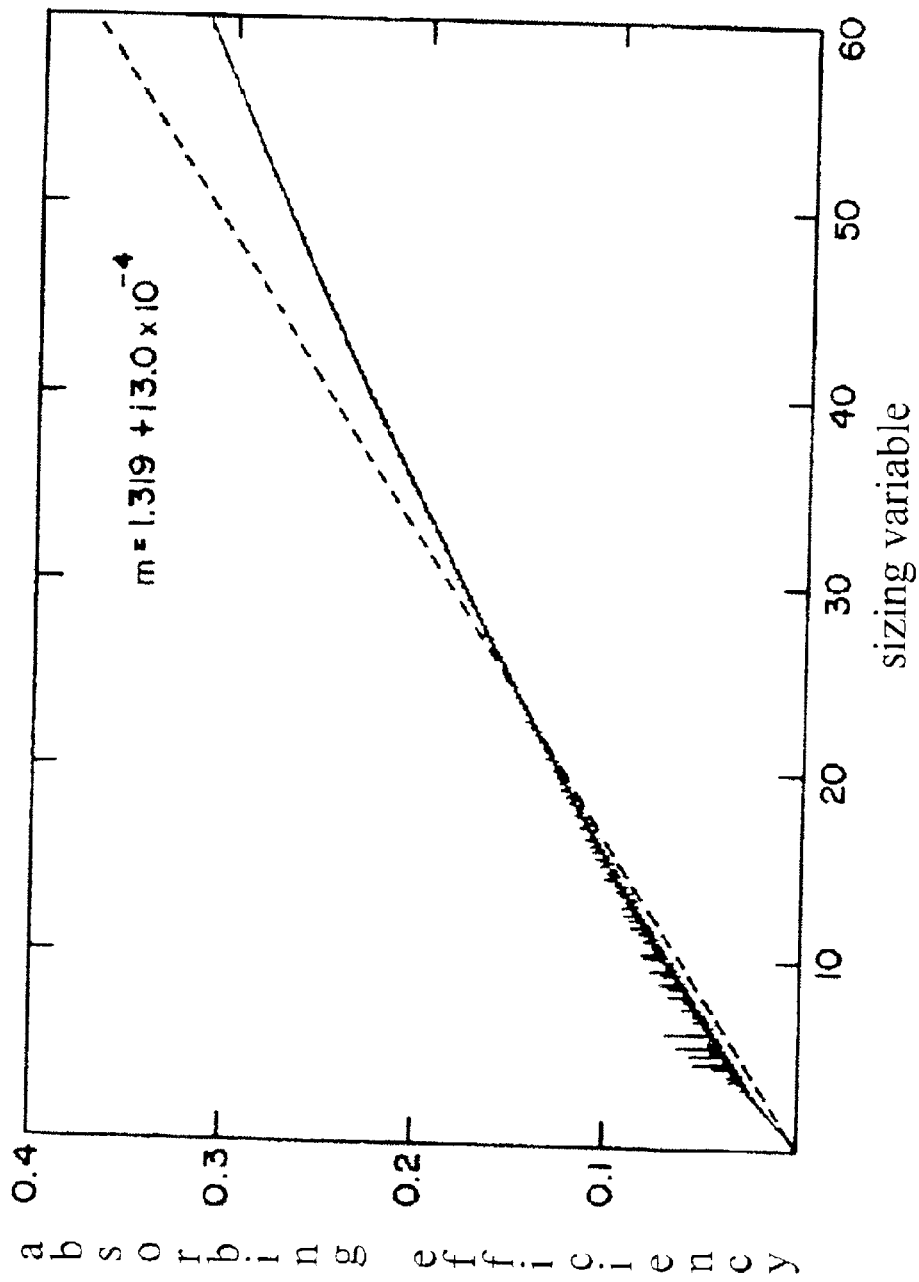
FIG. 28 is a relation chart of sizing variables and absorbing efficiencies of non-absorbing particles in a constant relative refractive index.

As shown in FIG. 25, non-polarized light beams totally change their polarization when the scattering angle is ninety degrees. The main parameters that effect scattering efficiency and absorbing efficiency of the non-absorbing particles 334 are size, relative refractive index, and shape of particles. As the shape of non-absorbing particles 334 is a globe, the sizing variable equals the product of wavenumbers and radius, relative refractive index equals the ratio of refractive index (N1) of non-absorbing particles 334 and refractive index (N) of the surrounding medium (the transparent thin film 333). As shown in FIG. 26, a relation chart of scattering efficiencies, sizing variables, and relative refractive indices, match of sizing variables and relative refractive indices controls scattering efficiency, and sizing variables of non-absorbing particles 334 should be less than ten. FIGS. 27A and 27B are scattering efficiency relation charts of P and S polarized light beams in different shapes of spheroids, incident angles, and sizing variables, so shapes of non-absorbing particles 334, incident angles of light beams, and polarization of light beams effect scattering efficiency. As shown in FIG. 28, a relation chart of sizing variables and absorbing efficiencies of non-absorbing particles in a constant relative refractive index, as the sizes of non-absorbing particles 334 increase, their absorbing efficiency is higher.

Thus, combinations of different types of the non-polarized light source 31, the splitter 32, and the transformer 33 achieve the embodiments of the light-guide module for emitting particular polarized light beams.

Figure 9:
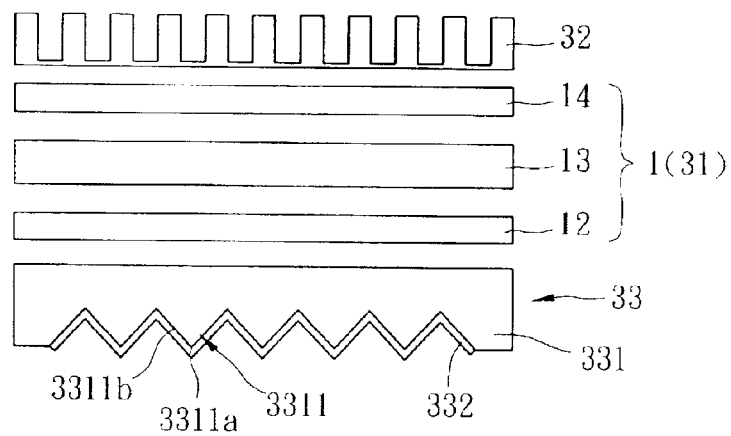
FIG. 9 is a schematic view of the first embodiment of a light-guide module for emitting particular polarized light beams.

As shown in FIG. 9, the first embodiment of the light-guide module for emitting particular polarized light beams comprises a non-polarized light source 31, a splitter 32, and a transformer 33.

As shown in FIG. 1, the non-polarized light source 31 is a single-surface EL 1 without a reflecting film 11. The non-polarized light source 31 has an insulating layer 12, a luminant layer 13, and a transparent electrode 14. The luminant layer 13 emits light beams, and is set between the insulating layer 12 and the transparent electrode 14.

The splitter 32 close to the transparent electrode 14 is a metal grating of nano-sizing to separate light beams by letting particular polarized light beams pass through and letting other light beams be reflected.

The transformer 33 close to the insulating layer 12 consists of a bottom cover 331 and a phase retardation film 332. The bottom cover 331 has a ridge surface with several ridge members 3311, each having a ridge line 3311a and two reflected surfaces 3311b. The distances between each ridge member 3311 may or may not be the same. The phase retardation film 332 has high reflectance and is attached to the ridge surface of the bottom cover 331.

Figure 10:
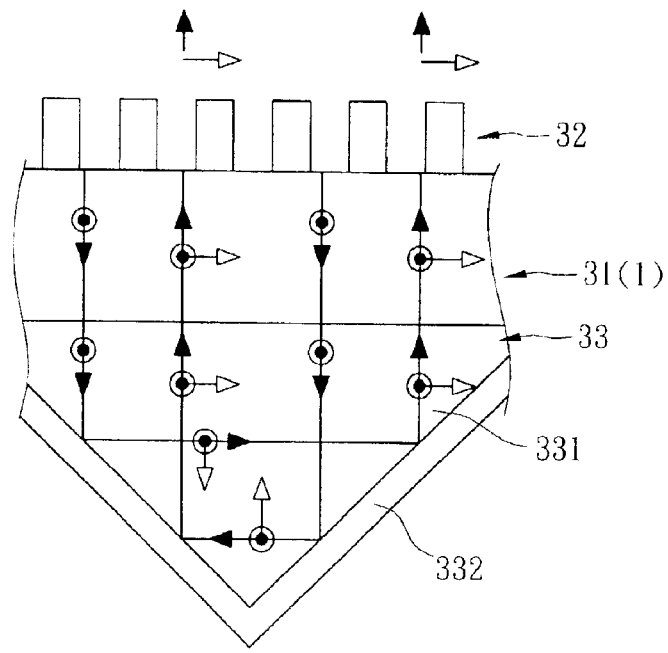
FIG. 10 is a schematic view of the light beam emitting direction in the first embodiment of a light-guide module for emitting particular polarized light beams.
Figure 11:
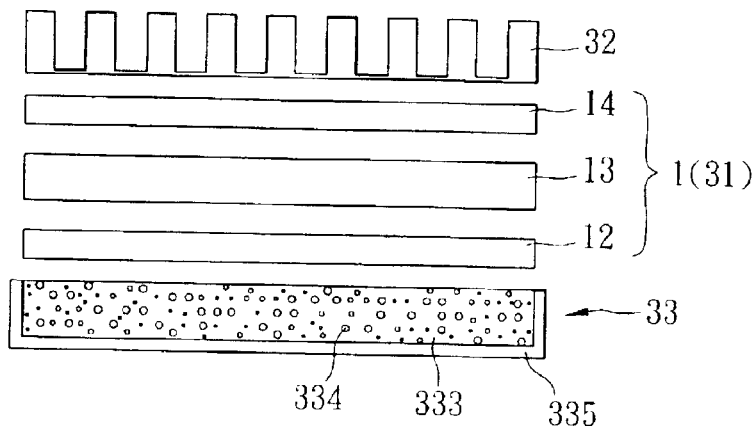
FIG. 11 is a schematic view of the second embodiment of a light-guide module for emitting particular polarized light beams.

In FIG. 10, with the combination of the non-polarized light source 31, the splitter 32, and the transformer 33, the light beam emitting direction is shown by solid arrows. Hollow arrows are the P polarized quantities of light beams. Patterns of a point inside the circle are the S polarized quantities of light beams, perpendicular to the P polarized quantities of light beams, or the polarization reflected by the splitter 32. After the non-polarized light source 31 emits light beams, light beams are upper-emitted to the splitter 32. The P polarized quantities of light beams pass the splitter 32 and are emitted without effected by the structure of the splitter 32. The S polarized quantities of light beams are reflected by the splitter 32 then repeated reflected by the ridge surface of the bottom cover 331 and converted by the phase retardation film 332 to the P polarized quantities and the S polarized quantities. (When the distances between each ridge member 3311 are not the same, the polarized direction in electric field of the S polarized quantities of light beams is not parallel to the ridge line 3311a.) The P polarized quantities of converted light beams pass the splitter 32 and are emitted. The S polarized quantities of converted light beams are reflected then converted by the phase retardation film 332 for having the P polarized quantities and the S polarized quantities. As shown in FIG. 11, the second embodiment of the light-guide module for emitting particular polarized light beams comprises a non-polarized light source 31, a splitter 32, and a transformer 33.

As shown in FIG. 1, the non-polarized light source 31 is a single-surface EL 1 without a reflecting film 11. The non-polarized light source 31 has an insulating layer 12, a luminant layer 13, and a transparent electrode 14. The luminant layer 13 emits light beams, and is set between the insulating layer 12 and the transparent electrode 14.

The splitter 32 close to the transparent electrode 14 is a metal grating of nano-sizing to separate light beams by letting particular polarized light beams pass through and letting other light beams be reflected.

The transformer 33 close to the insulating layer 12 consists of a transparent thin film 333, non-absorbing particles 334, and a phase retardation film 335. Non-absorbing particles 334 disperse in the transparent thin film 333. The phase retardation film 335 is set on one surface and the side surfaces of the transparent thin film 333 for avoiding light beam loss.

The light-guide module for emitting particular polarized light beams is the combination of the non-polarized light source 31, the splitter 32, and the transformer 33. After the non-polarized light source 31 emits light beams, light beams upper-emit to the splitter 32. The P polarized quantities of light beams pass the splitter 32 and are emitted without effected by the structure of the splitter 32. The S polarized quantities of light beams are reflected by the splitter 32 then hit non-absorbing particles 334 and scatter light beams with the P polarized quantities and the S polarized quantities. Later, the P polarized quantities of converted light beams pass the splitter 32. The S polarized quantities of converted light beams are reflected then converted by the phase retardation film 332 to the P polarized quantities and the S polarized quantities. The phase retardation film 335 reflects light beams to the transformer 33 as light beams scattering to the surrounding of the transformer 33 for preventing light beams from being emitted out of the transformer 33.

Figure 12:
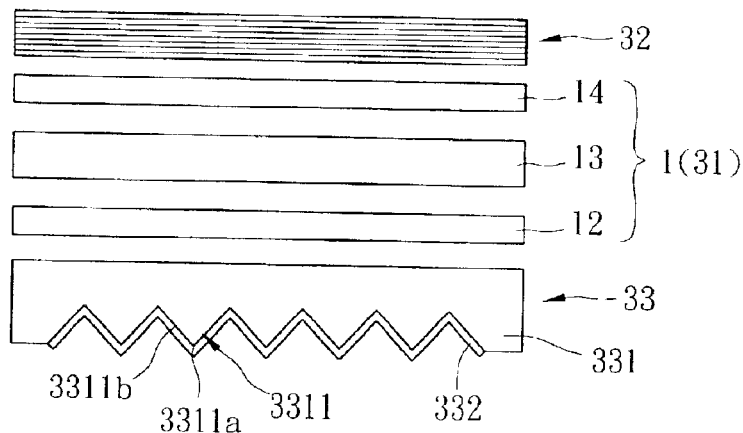
FIG. 12 is a schematic view of the third embodiment of a light-guide module for emitting particular polarized light beams.

As shown in FIG. 12, the third embodiment of the light-guide module for emitting particular polarized light beams comprises a non-polarized light source 31, a splitter 32, and a transformer 33.

As shown in FIG. 1, the non-polarized light source 31 is a single-surface EL 1 without a reflecting film 11. The non-polarized light source 31 has an insulating layer 12, a luminant layer 13, and a transparent electrode 14. The luminant layer 13 emits light beams, and is set between the insulating layer 12 and the transparent electrode 14.

As shown in FIG. 6, the splitter 32 close to the transparent electrode 14 which is a multi-layer film separates light beams by letting particular polarized light beams pass through and letting other light beams be reflected.

The transformer 33 close to the insulating layer 12 consists of a bottom cover 331 and a phase retardation film 332. The bottom cover 331 has a ridge surface with several ridge members 3311, each having a ridge line 3311a and two reflected surfaces 3311b. The distances between each ridge member 3311 may or may not be the same. The phase retardation film 332 has high reflectance and is attached to the ridge surface of the bottom cover 331.

Similarly, the light-guide module for emitting particular polarized light beams is the combination of the non-polarized light source 31, the splitter 32, and the transformer 33. After the non-polarized light source 31 emits light beams, light beams upper-emit to the splitter 32. The P polarized quantities of light beams pass the splitter 32 and are emitted without effected by the structure of the splitter 32. The S polarized quantities of light beams are reflected by the splitter 32 then repeatedly reflected by the ridge surface of the bottom cover 33 land converted by the phase retardation film 332 to the P polarized quantities and the S polarized quantities. (When the distances between each ridge member 3311 are not the same, the polarized direction in electric field of the S polarized quantities of light beams is not parallel to the ridge line 3311a.) The P polarized quantities of converted light beams pass the splitter 32. The S polarized quantities of converted light beams are reflected then converted by the phase retardation film 332 to the P polarized quantities and the S polarized quantities.

Figure 13:
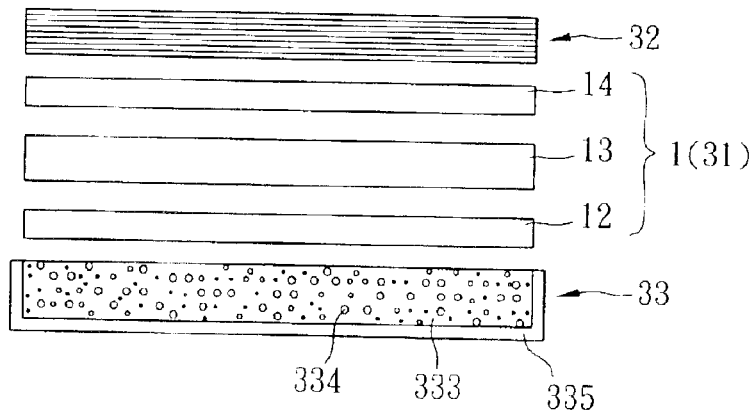
FIG. 13 is a schematic view of the fourth embodiment of a light-guide module for emitting particular polarized light beams.

As shown in FIG. 13, the fourth embodiment of the light-guide module for emitting particular polarized light beams comprises a non-polarized light source 31, a splitter 32, and a transformer 33.

As shown in FIG. 1, the non-polarized light source 31 is a single-surface EL 1 without a reflecting film 11. The non-polarized light source 31 has an insulating layer 12, a ruminant layer 13, and a transparent electrode 14. The luminant layer 13 emits light beams, and is set between the insulating layer 12 and the transparent electrode 14.

As shown in FIG. 6, the splitter 32 close to the transparent electrode 14 which is a multi-layer film separates light beams by letting particular polarized light beams pass through and letting other light beams be reflected.

The transformer 33 close to the insulating layer 12 consists of a transparent thin film 333, non-absorbing particles 334, and a phase retardation film 335. Non-absorbing particles 334 disperse in the transparent thin film 333. The phase retardation film 335 is set on one surface and the side surfaces of the transparent thin film 333 for avoiding light beam loss.

Similarly, the light-guide module for emitting particular polarized light beams is the combination of the non-polarized light source 31, the splitter 32, and the transformer 33. After the non-polarized light source 31 emits light beams, light beams upper-emit to the splitter 32. The P polarized quantities of light beams pass the splitter 32 and are emitted without effected by the structure of the splitter 32. The S polarized quantities of light beams are reflected by the splitter 32 then hit non-absorbing particles 334 and scatter light beams with the P polarized quantities and the S polarized quantities. Later, the P polarized quantities of converted light beams pass the splitter 32. The S polarized quantities of converted light beams are reflected then converted by the phase retardation film 332 to the P polarized quantities and the S polarized quantities. The phase retardation film 335 reflects light beams to the transformer 33 as light beams scattering to the surrounding of the transformer 33 for preventing light beams from being emitted out of the transformer 33.

Figure 14:
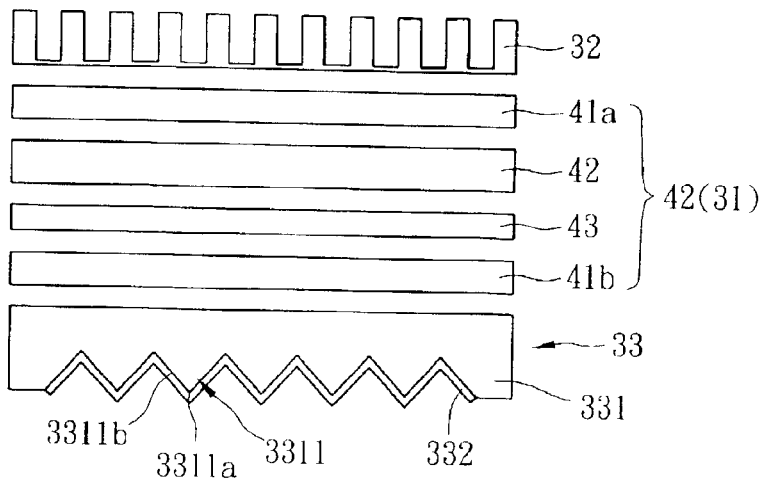
FIG. 14 is a schematic view of the fifth embodiment of a light-guide module for emitting particular polarized light beams.
Figure 15:
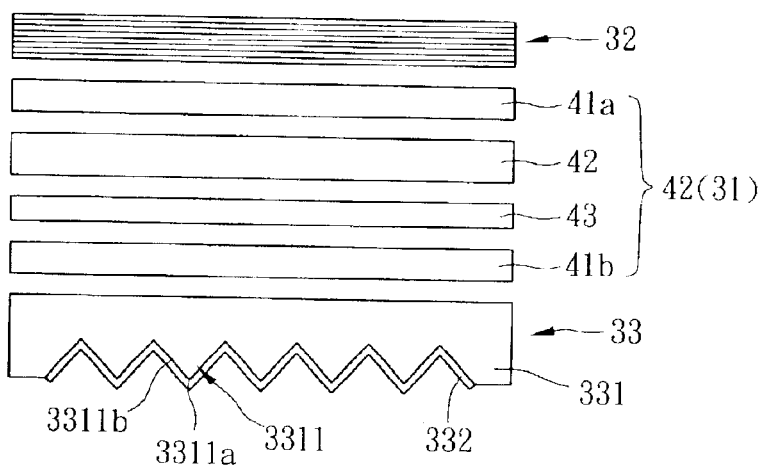
FIG. 15 is a schematic view of the sixth embodiment of a light-guide module for emitting particular polarized light beams.

As shown in FIGS. 14 and 15, the fifth and sixth embodiments of the light-guide module for emitting particular polarized light beams comprise a non-polarized light source 31, a splitter 32, and a transformer 33. The splitter 32 and the transformer 33 in the fifth and sixth embodiments are the same as the splitter 32 and the transformer 33 in the first and third embodiments. The non-polarized light source 31 is a two-surface EL 4, as shown in FIG. 4. The luminant layer 42 emits light beams upper-emitting to the transparent electrodes 41a and passing through the transparent electrodes 41a. The splitter 32 separates light beams by letting particular polarized light beams pass through and by letting other light beams be reflected. Otherwise, light beams are also down-emitted to the insulating layer 43 and the transparent electrodes 41b and reach the transformer 33 for converting their polarization. The polarized direction in electric field of the S polarized quantities of light beams is parallel to the ridge line 3311a of the ridge surface of the bottom cover 331, so the S polarized quantities of light beams cannot be converted and phase-delayed by the phase retardation film 332. Thus, adding magnetic members for the retarding phase of light beams is a must.

Figure 16:
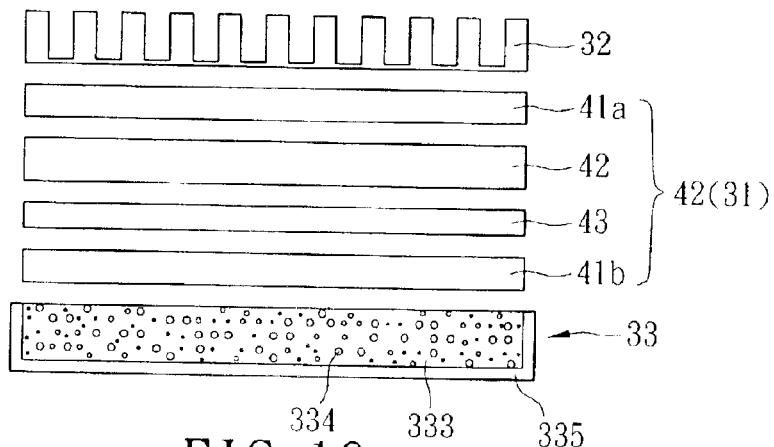
FIG. 16 is a schematic view of the seventh embodiment of a light-guide module for emitting particular polarized light beams.
Figure 17:
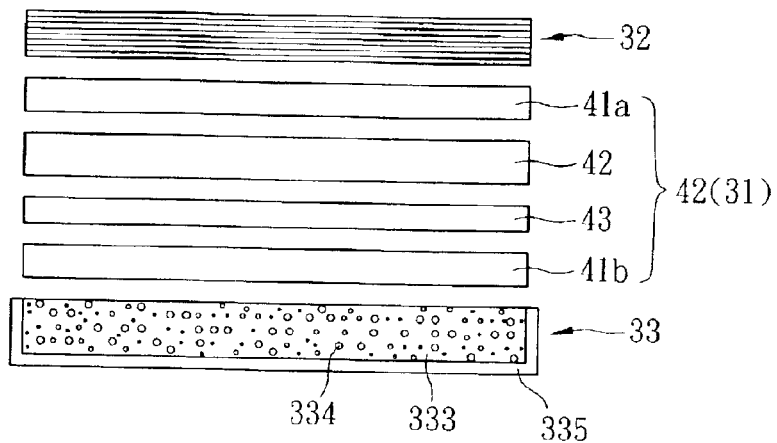
FIG. 17 is a schematic view of the eighth embodiment of a light-guide module for emitting particular polarized light beams.

As shown in FIGS. 16 and 17, the seventh and eighth embodiments of the light-guide module for emitting particular polarized light beams comprise a non-polarized light source 31, a splitter 32, and a transformer 33. The splitter 32 and the transformer 33 in the seventh and eighth embodiments are the same as the splitter 32 and the transformer 33 in the second and fourth embodiments. The non-polarized light source 31 is a two-surface EL 4, as shown in FIG. 4. The luminant layer 42 emits light beams upper-emitting to the transparent electrodes 41a and passing through the transparent electrodes 41a. The splitter 32 separates light beams by letting particular polarized light beams pass through and by letting other light beams be reflected. Otherwise, light beams are also down-emitted to the insulating layer 43 and the transparent electrodes 41b and reach the transformer 33 for converting their polarization.

Figure 18:
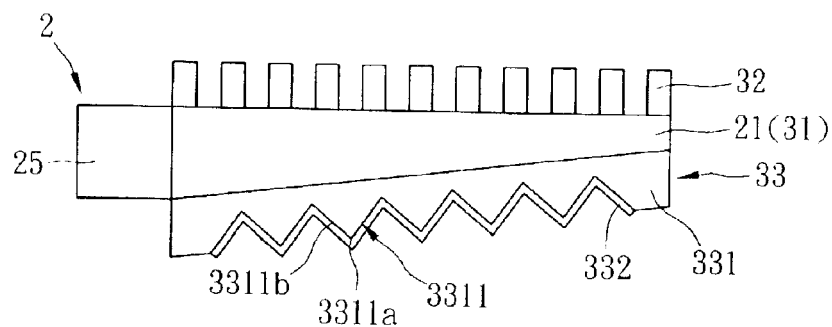
FIG. 18 is a schematic view of the ninth embodiment of a light-guide module for emitting particular polarized light beams.
Figure 19:
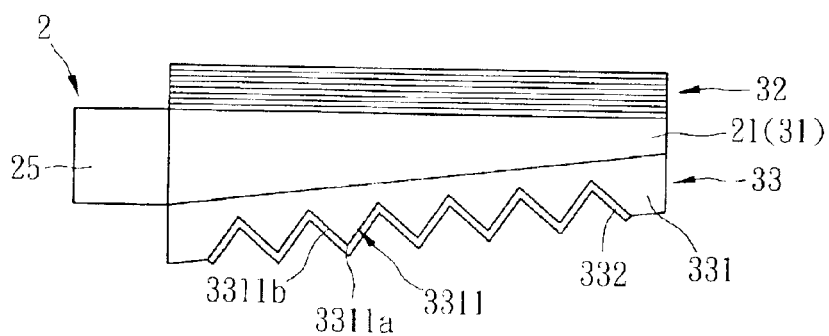
FIG. 19 is a schematic view of the tenth embodiment of a light-guide module for emitting particular polarized light beams.

As shown in FIGS. 18 and 19, the ninth and tenth embodiments of the light-guide module for emitting particular polarized light beams comprise a non-polarized light source 31, a splitter 32, and a transformer 33. The splitter 32 and the transformer 33 in the ninth and tenth embodiments are the same as the splitter 32 and the transformer 33 in the first and third embodiments. However, the non-polarized light source 31 is a CCFL 2 comprising a guiding plate 21 and a light source 25, as shown in FIG. 2. The light source 25 is set in one side of the guiding plate 21 having an inclined plane. The transformer 33 is set close to the inclined plane of the guiding plate 21, and the splitter 32 is set close to the other side of the guiding plate 21 opposite to the transformer 33. Light beams, emitted from the light source 25 of the CCFL 2 then guided by the guiding plate 21, output from the upper and bottom surfaces of the guiding plate 21. Light beams passing the upper surface are then emitted to the splitter 32. Light beams passing the bottom surface are emitted to the transformer 33 for converting their polarization. To avoid light energy loss, a reflecting film coats the side surfaces of the guiding plate 21 except the side surface close to the light source 25 for restricting light beams inside the guiding plate 21. Avoiding total internal reflection in the interface of the bottom surface of the guiding plate 21 and the bottom cover 331 without achieving he effect of converting their polarization, the refractive indices of the bottom cover 331 and the guiding plate 21 are close to one another or the same.

Figure 20:
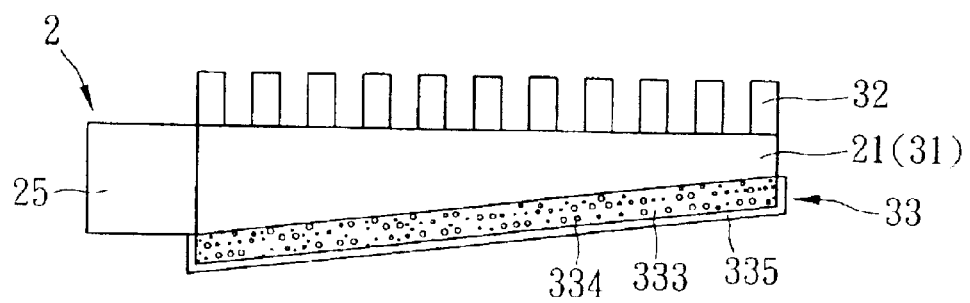
FIG. 20 is a schematic view of the eleventh embodiment of a light-guide module for emitting particular polarized light beams.
Figure 21:
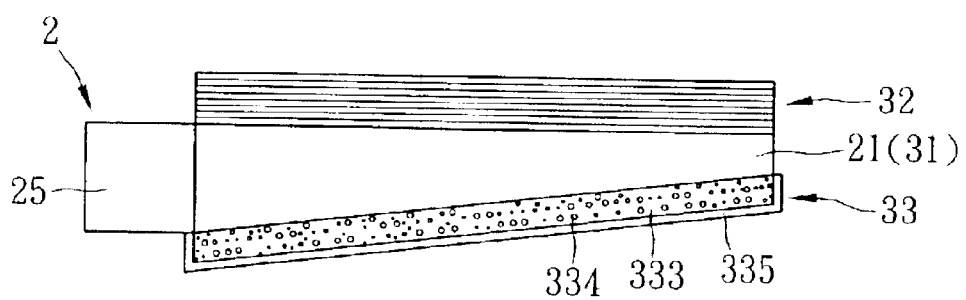
FIG. 21 is a schematic view of the twelfth embodiment of a light-guide module for emitting particular polarized light beams.

As shown in FIGS. 20 and 21, the eleventh and twelfth embodiments of the light-guide module for emitting particular polarized light beams comprise a non-polarized light source 31, a splitter 32, and a transformer 33. The splitter 32 and the transformer 33 in the eleventh and twelfth embodiments are the same as the splitter 32 and the transformer 33 in the second and fourth embodiments. However, the non-polarized light source 31 is a CCFL 2 comprising a guiding plate 21 and a light source 25, as shown in FIG. 2. The light source 25 is set in one side of the guiding plate 21 having an inclined plane. The transformer 33 is set close to the inclined plane of the guiding plate 21, and the splitter 32 is set close to the other side of the guiding plate 21 opposite to the transformer 33. Light beams, emitted from the light source 25 of the CCFL 2 then guided by the guiding plate 21, are output from the upper and bottom surfaces of the guiding plate 21. Light beams passing the upper surface are then emitted to the splitter 32. Light beams passing the bottom surface are emitted to the transformer 33 for converting their polarization. To avoid light energy loss, a reflecting film coats the side surfaces of the guiding plate 21 except the side surface close to the light source 25 for restricting light beams inside the guiding plate 21. Avoiding total internal reflection in the interface of the bottom surface of the guiding plate 21 and the bottom cover 331 without achieving the effect of converting their polarization, the refractive indices of the bottom cover 331 and the guiding plate 21 are close to one another or the same.

The advantages of the light-guide module for emitting particular polarized light beams are:

1. One type of splitter which is a metal grating of nano-sizing makes the light-guide module have high efficiency in separating polarized light beams in the visible light range. The processing of the splitter with a simple structure is easy.

2. The transformer with high efficiency makes light beams emitting to the splitter after converting their polarization for emitting particular polarized light beams in fairly low light energy loss.

3. No matter what kind of non-polarized light source matching the splitter and the transformer, the light-guide module for emitting particular polarized light beams has high efficiency to increase the size and the brightness of liquid crystal displays, and decrease the power consumption.

4. The light-guide module for emitting particular polarized light beams can be put in the present backlight module or taken as a backlight module. So the light-guide module satisfies the need for integrated functions, electricity saving, simplified fabrication, low-cost, and thinner.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A light-guide module for emitting particular polarized light beams, comprising:
   a non-polarized light source for emitting non-polarized light beams;
   a splitter setting in one end of the non-polarized light source to let particular polarized light beams pass through and to let other light beams be reflected; and
   a transformer setting in the other end of the non-polarized light source corresponding to the splitter to convert the polarization of light beams passing through, the non-polarized light source, which is a single-surface EL, comprises an insulating layer close to the transformer, a transparent electrode close to the splitter, and a luminant layer between the insulating layer and transparent electrode.

2. The light-guide module of claim 1, wherein the splitter is a metal grating of nano-sizing.

3. The light-guide module of claim 2, wherein the material of the splitter is chosen from a group of aluminum, silver, and wolfram.

4. The light-guide module of claim 2, wherein the refractive index period of the splitter ranges from 10 to 170 nano-meters, and the depth of the splitter ranges from 10 to 200 nano-meters.

5. The light-guide module of claim 1, wherein the splitter is a multi-layer film.

6. The light-guide module of claim 1, wherein the splitter is repeatly stacking up PEN (2,6-polyethylene naphthalate) and coPEN (polymerization by naphthalic acid, terephalic acid, and ethylene glycol).

7. The light-guide module of claim 1, wherein the transformer comprises:
   a bottom cover comprising a ridge surface with a plurality of ridge members each having a ridge line and two reflected surfaces; and
   a phase retardation film having high reflectance and attached to the ridge surface of the bottom cover.

8. The light-guide module of claim 7, wherein the ridge lines of the ridge surface is not parallel to the polarized direction in electric field of light beams reflected by the splitter.

9. The light-guide module of claim 7, wherein the angle of adjacent surfaces of the two ridge members ranges from 45 to 135 degrees.

10. The light-guide module of claim 7, wherein the distances between each the ridge member are the same.

11. The light-guide module of claim 7, wherein the distances between each the ridge member are not the same.

12. A light-guide module for emitting particular polarized light beams, comprising:
   a non-polarized light source for emitting non-polarized light beams;
   a splitter setting in one end of the non-polarized light source to let particular polarized light beams pass through and to let other light beams be reflected; and
   a transformer setting in the other end of the non-polarized light source corresponding to the splitter to convert the polarization of light beams passing through;
   wherein the non-polarized light source, which is a CCFL, comprises a guiding plate having an inclined plane close to the transformer and a light source setting in one side of the guiding plate, and other surface corresponding to the inclined plane close to the splitter, and wherein the splitter is a metal grating of nano-sizing.

13. The light-guide module of claim 12, wherein the material of the splitter is chosen from a group of aluminum, gold, silver, and wolfram.

14. The light-guide module of claim 12, wherein the refractive index period of the splitter ranges from 10 to 170 nano-meters, and the depth of the splitter ranges from 10 to 200 nano-meters.

15. The light-guide module of claim 12, wherein the splitter is a multilayer film.

16. The light-guide module of claim 12, wherein the splitter is repeatly stacking up PEN (2,6-polyethylene naphthalate) and coPEN (polymerization by naphthalic acid, terephalic acid, and ethylene glycol).

17. The light-guide module of claim 12, wherein the transformer comprises:
   a bottom cover comprising a ridge surface with a pluarity of ridge members each having a ridge line and two reflected surfaces; and
   a phase retardation film having high reflectance and attached to the ridge surface of the bottom cover.

18. The light-guide module of claim 17, wherein the ridge lines of the ridge surface is not parallel to the polarized direction in electric field of light beams reflected by the splitter.

19. The light-guide module of claim 17, wherein the angle of adjacent surfaces of the two ridge members range from 45 to 135 degrees.

20. The light-guide module of claim 17, wherein the distances between each the ridge member are the same.

21. The light-guide module of claim 17, wherein the distances between each the ridge member are not the same.

22. A light-guide module of for emitting particular polarized light beams, comprising:
   a non-polarized light source for emitting non-polarized light beams;
   a splitter setting in one end of the non-polarized light source to let particular polarized light beams pass through and to let other light beams be reflected; and
   a transformer setting in the other end of the non-polarized light source corresponding to the splitter to convert the polarization of light beams passing thorough
   wherein the transformer comprises a transparent thin film and a plurality of non-absorbing particles disperse in the transparent thin film, wherein when non-polarized light beams hit the plurality of non-absorbing particles inside the transparent thin film, light beams scatter to change their polarization.

23. The light-guide module of claim 22, wherein the non-polarized light source, which is a two-surface EL, comprises an insulating layer, two transparent electrodes, and a luminant layer between the insulating layer and one of the transparent electrodes close to the splitter, and the other side of the insulating layer attached to the other side of the transparent electrode close to the transformer.

24. The light-guide module of claim 22, wherein the thickness of the transparent thin film is less than 20 micrometers.

25. The light-guide module of claim 22, wherein the refractive index of the transparent thin film and refractive index of the non-polarized light source are closed or the same.

26. The light-guide module of claim 22, wherein the sizing variables of the plurality of non-absorbing particles are less than ten.

27. The light-guide module of claim 22, wherein the material of the plurality of non-absorbing particles is chosen from a group of barium sulfate (BaSO4), magnesium oxide (MgO), titniuma dioxide (TiO2), and zinc sulfide (ZnS).

28. The light-guide module of claim 22, wherein the shape of the plurality of non-absorbing particles is chosen from a group of a globe, a spheroid, a cylinder, and other polyhedrons.

* * * * *